Patented Feb. 1, 1949

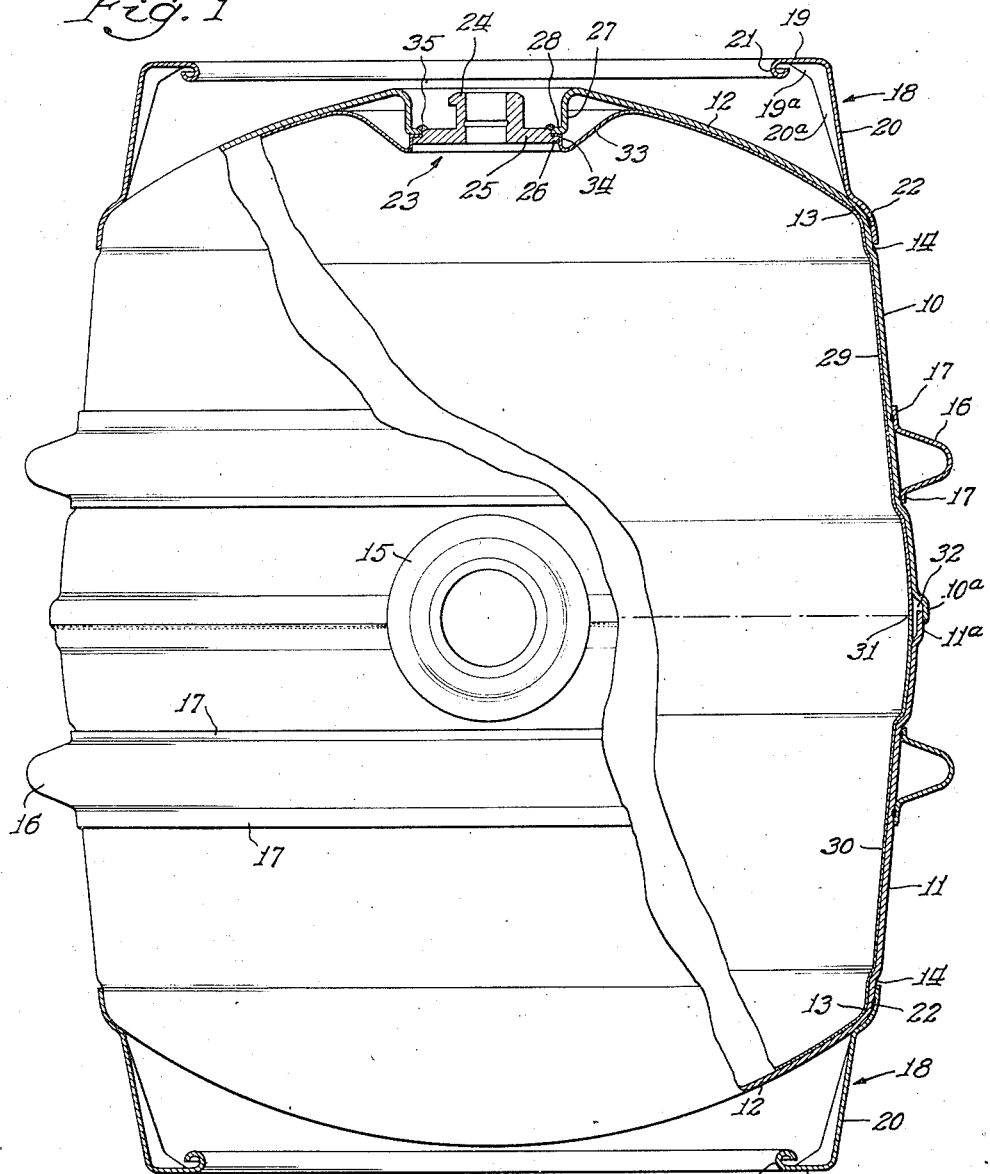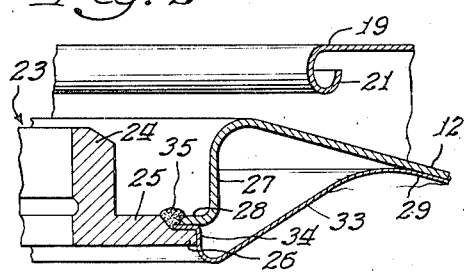

2,460,756

UNITED STATES PATENT OFFICE 2,460,756

LINER AND TAP RING FOR STEEL BARRELS

Ernst R. Koppel, Chicago, Ill., assignor to Borg-Warner Corporation, Chicago, Ill., a corporation of Illinois Application August 22, 1945, Serial No. 611,977

6 Claims. (Cl. 285—49)

This invention relates to metal barrels and has especial reference to a sheet steel barrel having a stainless steel liner and a stainless steel tap hole fitting.

It is one of the principal objects of this invention to simplify the construction of steel barrels, such as contemplated herein, and to improve the efficiency and dependability of such barrels.

Another principal object resides in a novel arrangement wherein the tap hole fitting is securely assembled with and anchored to the barrel shell, preferably by welding in a manner which prevents damage to the parts and presents an outside seam.

A further principal object is to construct a steel barrel with a stainless steel liner in a manner which effects a much sturdier assembly than stainless steel barrels heretofore produced. In this connection the barrel shell is comprised of a plurality of sections united by welding; the arrangement being such that the relatively thin liner is not noticeably affected by the welding operation which joins the shell sections.

Still another object resides in providing a liner of stainless steel for a sheet steel barrel wherein the interior of the barrel presents an approximately continuous smooth inner surface which is unbroken by outwardly bulged pockets, which form deep recesses or the like which render the cleansing of the barrel a difficult and uncertain operation. As a result this assembly produces a barrel of a highly sanitary character.

Also it is an object hereof to provide a lined sheet steel barrel wherein the liner conforms to the inner contour of the shell substantially throughout the superficial area of the interior surface of the shell, whereby the liner has a continuous unbroken surface and is effectively supported by the shell without extraneous devices.

Still another object is to provide a chime arrangement for a stainless steel lined metal barrel wherein the chime rings are made separate from the barrel shell, thereby eliminating the necessity of forming the chimes integrally with the shell. Prior barrels on which the chimes are formed integral with the shell have been found objectionable because of the fact that, in order to shape the chimes, offset pockets or recesses are formed in the shell outside the liner and as a result the liner is unsupported across the mouths of the pockets.

It is also an object to provide a steel barrel with a tap hole fitting formed of stainless steel, and so constructed and arranged that a telescopic type of joint is effected between the fitting and the shell whereby the fitting may be pressed into the tap hole to secure a snug fit between the parts.

Another object is to provide a stainless steel lined metal barrel, the shell of which comprises two or more suitably shaped sections, with the approximate margins telescoped and united by a welded seam. This arrangement allows slight endwise variations for assembling the shell sections in encompassing relation to the liner to secure a surface contact fit of the liner in the shell. Also there is a slight clearance between the joint of the shell sections and the liner to prevent heat transfer during welding the joint.

The above mentioned and other aims or advantages of the present invention will be apparent to persons skilled in the art after the improvements contemplated herein are understood from the within description taken in connection with the accompanying drawing which forms a part hereof, in which:

Fig. 1 shows the improved barrel in elevation with portions thereof in broken away section.

Fig. 2 is an enlarged fragmental section showing details of the tap hole fitting assembled with the barrel head and liner.

Fig. 3 is a sectional view similar to Fig. 2 showing the manner of assembling a tap hole fitting on the barrel when the liner is omitted.

The drawings are to be understood as being more or less of a schematic character for the purpose of disclosing a typical or preferred form of the improved metal barrel assembly contemplated herein.

The body or shell of this barrel is of an all metal type of prefabricated sheet steel construction and comprises two similarly shaped sections 10 and 11. These shell sections are of relatively deep bowl-shape, the rims or margins of which have radially offset portions 10a and 11a, respectively, extending circumferentially around the respective sections. The shape and dimensions of offset portions 10a and 11a are such that the rim of one section may be telescoped on the rim of the other section and then welded together to assemble the complete barrel shell. This arrangement permits of slight variations when assembling the shell sections 10 and 11 over the liner with which the barrel may be provided, as will later appear.

The heads 12 of the barrel are of shallow dome shape and at the junctions where the domes meet the side walls of the shell there are terminal regions 13 having a segmental or arcuate cross section. Adjacent these terminal regions 13, the barrel shells have abutments 14 which are made by providing well-defined shoulders in the walls of the shells. The purpose of this corner or terminal arrangement is to provide an improved and dependable manner of quickly assembling the chimes on the barrel.

The usual bung-hole fitting 15 is inserted in an aperture located centrally in the barrel, said fitting being anchored to the margin of the bung-hole in any suitable manner, preferably by a leak-proof welded seam. Sheet metal bilge hoops 16 having U-section with lateral wings 17 embracing the mid-region of the shell, are welded on the exterior thereof to constitute the rolling tracks or rings of the barrel.

The chimes 18 at the ends of the barrel are made of separate blanks or strips of steel which are anchored to the barrel in a novel and effective manner which avoids the formation of pockets in the shell and the use of reinforcement incident thereto in either a lined or unlined barrel. The construction and arrangement of these chimes are such that they effectively reinforce and support the ends of the barrel, and they provide handgrips by which the barrel may be lifted. Each chime 18 is an annulus of L-shape cross section having a radially inwardly extending flange 19, and an axially extending attaching flange 20 which is, in effect, a continuation of the barrel contour. Flanges 19 and 20 are reinforced by a plurality of channels or indentations 19a and 20a, respectively, and the inner margin of radial flange 19 has a rolled bead 21 as shown in Fig. 1. Chime flange 20 also has a segmentally or arcuately formed region or annular outwardly curved embossment 22 extending along its margin, the inner surface of which fits the curved corner or terminal region 13 of the barrel to which it is united by welding. As seen, the margin of embossment 22 abuts shoulder 14 on the shell, and when the chimes are assembled on the shell they are preferably anchored to the shell by a welding operation which may be performed at the same time the hoop 16 is welded in position so that both operations are performed on one machine, thus reducing time and labor.

The tap fitting 23 is preferably made from stainless steel and is shown as comprising the axial tubular stub 24 terminating at its inner end with an annular flange 25 on which there is a shoulder 26. The central region of the barrel head has an inturned axially extending cylindrical portion 27 terminating in a lateral flange 28 arranged radially to the shoulder 26 of the fitting 23 and to which it is anchored by an outside weld in the manner hereinafter described. Conceivably, other types of fittings, allowing for different closures, could be attached in a similar manner.

The liner is made of stainless steel, herein shown in two sections 29 and 30 having substantially the same dimensions and general shapes. It will be appreciated the liner may comprise two shallower end sections and a circular center section united by welding. The liner sections as herein shown are of relatively deep bowl-shape with their proximate edges abutting and welded together at 31. The outer contour of the assembled liner conforms in practically all respects to the inside contour of the barrel shell or body, and its inner surface has a smooth contour which facilitates the cleansing of the barrel and insures a sanitary condition. At the offset portions 10a and 11a of the barrel shell the liner has a slight clearance 32 between it and the shell which provides a gap to prevent heat transfer from the shell to the liner when the shell sections are being welded. Otherwise the liner is in intimate contact with all portions of the barrel shell so that it is effectively supported by surface contact therewith.

Adjacent the tap fitting 23 the head of the liner curves inwardly as at 33 providing a depressed central region with oblique walls. This depressed or oblique region 33 of the liner terminates inwardly in an L-shape flange 34 having a cylindrical shape and axially disposed with respect to the tap fitting 23. In assembling the liner flange 34 with the fitting, the flange 25 of the fitting is pushed into the cylindrical portion 34 in a telescopic manner so that the lateral or radial lip of liner flange 34 is interposed between the shoulder 26 and the flange 28 of the head. When thus assembled the fitting 23 and head flange 28 together with the liner lip are permanently assembled, the fitting 23 and head flange 28 together with the liner lip are permanently anchored by means of an outside weld 35.

By reason of the improved assembly for mounting the tap fitting 23 in the head of a barrel having a stainless steel liner, the outer end of tap stub 24 is beneath the highest portion of the head 12 and this high portion of the head is, in turn, back of or beneath the plane of chime flange 19. Thus the head and the stainless steel tap fitting are effectively protected by the chime when the barrel is up-ended and standing in an upright position on a chime, and damage to the fitting and the thin liner at the head of the barrel is prevented. Also it will be apparent that the outside weld 35 which unites the fitting to the barrel head is protected against damage and, in the event a leak occurs, it will immediately be observed and may be readily repaired merely by renewing the weld 35 without removing the fitting.

Conceivably, the same arrangement for mounting of the tap fitting 23 may be used in an unlined barrel as shown in Fig. 3. The domed head 12 of the barrel shell has a depressed region 36 corresponding with the depressed region 33 of the liner 29 (Fig. 2). The central region of depression 36 has an opening which provides the tap hole, and surrounding this hole the shell has an annular flange of L-section. Upstanding cylindrical portion 37 of this flange contacts the edge of fitting flange 26, and the radial portion 38 overlies the shouldered edge of said flange 26. An annular bracket 39, which provides rigid reinforcement for the assembly, comprises a metal stamping of inverted dish-shape cross section arranged in overlying relationship to the depressed region 36 of the barrel head to which it is welded as at 40. The inner margin of annular bracket 39 has a cylindrical axial flange 41 projecting into depressed region 36 of the shell head and terminating in a radial flange 42 which is superposed on flange 38 of the barrel head. The overlying portions of the head, the fitting flange, and the bracket are united by an outside weld 35a.

By reason of this arrangement the radial flange 38 and 42 of the head and bracket are anchored to each other and are securely attached to the fitting by a visible outside seam. Also the overhanging flange 19 of the chime is in a position beyond the plane of the tap fitting assembly so that it affords good protection for the fitting when the barrel is up-ended and standing on the chime.

The improved arrangements disclosed herein eliminates the objectionable pockets hereinbefore mentioned, and it effects a substantial reduction in the cost of manufacture. Furthermore, a continuous smooth interior surface is presented throughout superficial area of the barrel interior. Any small offset regions which may appear in the drawings are very shallow and are approximately no greater than the thickness of the metal from which the shell is fabricated. During the fabrication of the barrel the liner sections preformed to the inner contour of the shells are welded together, and then the shell sections, with the chimes and hoops welded in place, are fitted around the complete liner in close contact thereto. Thereafter, the shell sections are welded together in the manner hereinbefore explained. All this is done without injury to the thin stainless steel of which the liner is made.

While the invention has been disclosed in a typical or preferred embodiment thereof, it will be apparent to persons skilled in the art, after understanding the invention, that changes or modifications thereof may be made without departing from the spirit of the invention. It is aimed in the appended claims to cover all such changes or modifications.

I claim:

1. A barrel formed of sheet metal comprising a hollow shell; heads integral with said shell for closing the ends thereof; an inwardly dished depression in one of said heads having a tap aperture; a tap fitting having a tubular stub protruding through said aperture, said fitting having a flange the outer face of which is engaged with the margin of the head surrounding said aperture; a sheet metal annular bracket surrounding said fitting and anchored at its radially outer region to said head, the radial inner region of said bracket being superposed on the region of the head which engages the fitting flange; and an outside weld anchoring said superposed regions of the head and bracket to the fitting flange.

2. A barrel formed of sheet metal comprising a hollow shell; heads integral with said shell for closing the ends thereof; a tap aperture in one of said heads; a tap fitting having a tubular stub protruding through said aperture and having a flange the outer face of which is engaged with the margin of the head surrounding said aperture; a sheet metal annular bracket surrounding said fitting and anchored at its radially outer region to the outer face of said head, the radial inner region of said bracket being superposed on the region of the head which engages the fitting flange; and an outside weld anchoring said superposed regions of the head and bracket to the fitting flange.

3. A barrel formed of sheet metal comprising a hollow shell; heads integral with said shell for closing the ends thereof; an inwardly dished depressed region in one of said heads having a centrally arranged opening, said depressed portion having an inwardly extended L-shape portion at the rim of said opening; a flanged tap fitting protruding through said opening with the lateral member of said L-shape portion overlying the flange of said fitting; and an outwardly dished annular bracket of sheet metal arranged with its radially outer margin overlying and welded to a region of said head that is radially outward from said depressed portion, said bracket having a radially inner portion which engages the L-shape portion of said head and is welded thereto by an outside seam.

4. A barrel formed of sheet metal comprising a hollow shell; heads integral with said shell for closing the ends thereof; an inwardly dished depressed region in one of said heads having a centrally arranged opening, said depressed portion having an inwardly extended L-shape portion at the rim of said opening; a flanged tap fitting protruding through said opening with the lateral member of said L-shape portion overlying the flange of said fitting; and an outwardly dished annular bracket of sheet metal arranged with its radially outer margin overlying and welded to a region of said head that is spaced from said fitting, said bracket having an L-shape flange at its radially inner margin, which flange extends to and is united to the L-shape portion of said head by an outside weld.

5. In a seamless barrel formed of sheet metal defining a hollow shell, the combination of a head integral with said shell for closing the top end thereof, said head having an inwardly dished depressed region having a centrally arranged opening, said depressed portion having an inwardly extended L-shape portion at the rim of said opening, a flanged tap fitting protruding through said opening with the lateral member of said L-shape portion overlying the flange of said fitting, and an outwardly dished annular bracket of sheet metal related to said head, said bracket having a radially inner portion which engages the L-shape portion of said head and is welded thereto by a single seam disposed outside of said barrel.

6. In a seamless barrel formed of sheet metal defining a hollow shell and having heads integral with said shell for closing the ends thereof, the combination of an inwardly dished depressed region in one of said heads having a centrally arranged opening, said depressed portion having an inwardly extended L-shape portion at the rim of said opening, of a flanged tap fitting protruding through said opening with the lateral member of said L-shape portion overlying the flange of said fitting; and of an outwardly dished annular bracket of sheet metal related to said head, said bracket having an L-shape flange at its radially inner margin, which flange extends to and is united to the L-shape portion of said head by a weld disposed outside of said barrel.

ERNST R. KOPPEL.

REFERENCES CITED

The following references are of record in the file of this patent:

UNITED STATES PATENTS

| Number | Name | Date |
| --- | --- | --- |
| 1,517,530 | Boyle | Dec. 3, 1924 |
| 2,018,683 | Meyer | Oct. 29, 1935 |
| 2,092,490 | Zerbe | Sept. 7, 1937 |
| 2,243,164 | Maddock | May 27, 1941 |
| 2,245,430 | Courtright et al. | June 10, 1941 |
| 2,316,437 | Kercher | Apr. 13, 1943 |